May 21, 1935.  P. H. CRAIG  2,001,837
POWER CONTROL CIRCUITS
Filed Dec. 10, 1932   2 Sheets-Sheet 1

Inventor
PALMER H. CRAIG
By Ralph B. Stewart
Attorney

Inventor
PALMER H. CRAIG
BY
Ralph B. Stewart
Attorney

Patented May 21, 1935

2,001,837

UNITED STATES PATENT OFFICE 2,001,837

POWER CONTROL CIRCUITS

Palmer Hunt Craig, Cincinnati, Ohio, assignor to Invex Corporation, a corporation of New York Application December 10, 1932, Serial No. 646,662

17 Claims. (Cl. 250—27)

My invention relates to electric circuits and more particularly to arrangements for controlling the flow of power in electric circuits.

This application is in part a continuation of my copending application Ser. No. 577,691, filed November 27, 1931.

In my copending application identified above I have disclosed electric relay circuits for the control of relatively large currents and power in response to amplitude variations of a control voltage of fixed phase applied to the relay circuit. The invention in its broadest aspect is being claimed in the earlier filed application. One form of the invention disclosed in the earlier case in which the control relay employs two control electrodes will be claimed in the present application. The present case will also include a modification of the fundamental circuit disclosed in my earlier application.

The broad object of my invention is to devise a voltage responsive electric relay of the vapor-electric type for controlling the flow of power in a circuit in response to variations in amplitude of a control voltage of fixed phase applied to the relay.

A further object of the present invention is to devise a control circuit of high efficiency for the control of substantial amounts of power by control apparatus having limited current carrying capacity. My invention is particularly useful as a dimmer circuit for theater lights and the like, although it may be used in other situations requiring a variation in the amount of power supplied to a load circuit.

My invention is illustrated in the accompanying drawings in which.

Figure 1:
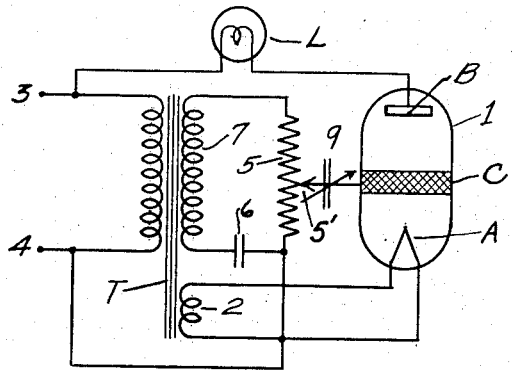
Figure 1 shows the fundamental control circuit disclosed in my earlier filed application.

Referring to the drawings, Figure 1 shows the fundamental circuit being claimed in my copending application Ser. No. 577,691. Briefly this arrangement comprises a vapor electric relay 1, such as a mercury vapor tube, having an electron emitting cathode A, an anode B and a control electrode C, which is preferably arranged on the outside of the tube envelope. The cathode A is heated from winding 2 of a transformer T connected across the source of alternating current 3—4. A resistance 5 and a condenser 6 are connected in series across the secondary winding 7 of transformer T, and one end of the resistance 5 is connected to the cathode circuit, which in turn is connected to one side of the supply circuit. A variable tap 5' on resistance 5 is connected to the control electrode C, and the anode B is connected through a load L to the other side of the supply circuit. The values of resistance 5 and condenser 6 are so chosen that the potential applied to the control electrode C lags behind the voltage of the anode B by an angle of the order of 135°. This phase displacement is not absolute, but may be varied between 90° and 180° with varying results. Shifting the contact 5' along resistance 5 varies the amplitude of the control voltage applied to the electrode C and thereby varies the time of starting of the arc in each pulsation of the line voltage when the anode is positive with respect to the cathode. Increasing the amplitude of the control voltage delays the starting of the arc in each positive pulsation and thereby results in a decrease in effective load current, and a decrease in the amplitude of the control voltage advances the starting point of the arc to increase the effective value of the load current. It will be understood that once the arc is started it continues to flow until the end of the pulsation or until the anode voltage is less than the ionizing potential. If desired the variable contact 5' may be allowed to remain stationary and the amplitude of the voltage applied to the control electrode C may be varied by varying the capacity of a variable condenser 9 inserted in the lead between the resistance 5 and the control electrode. Increasing the value of the capacity results in a decrease in the effective value of the load current. It will be understood that variable condenser 9 may be omitted when control is obtained by use of variable contact 5'.

Using a lamp load at L, and a mercury vapor rectifier tube with an external grid as the control tube, I have obtained good dimmer control with the circuit arrangement shown in Figure 1, employing a resistance 5 of the order of 100,000 ohms and a condenser 6 having a capacity of the order of 0.02 to 0.03 micro-farads; the secondary winding 7 delivering a terminal voltage of the order of 600 volts, with an impressed primary voltage of 120 volts at 60 cycles. Since the control electrode C is located outside of the tube, the current drawn by this electrode is substantially nil and the power consumed by the control circuit is very low. The circuit constants given above are for illustration only; it being obvious that the values in any particular circuit will depend upon the characteristics of the tube and other circuit constants and requirements. The rectifier tube employed was of the type described in Q. S. T. February, 1929, pages 20, 21 and 22. The rectifier tube was provided with an external electrode which served as a control electrode or grid.

Figure 2:
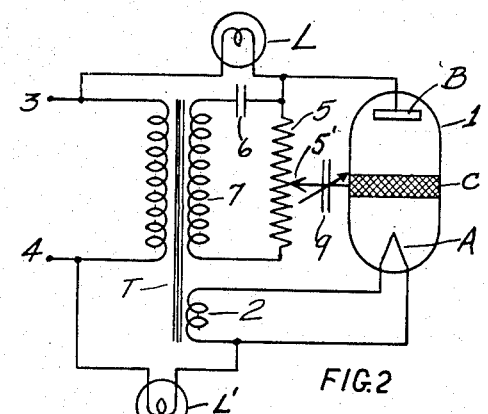
Figure 2 illustrates a modification of the fundamental circuit wherein a control voltage of fixed phase but variable amplitude is applied between the plate or anode and the control electrode.

A modification of the fundamental circuit is disclosed in Figure 2 wherein elements corresponding to like elements in Figure 1 are indicated by corresponding reference numerals. In this arrangement, the control voltage is applied between the anode B and the control electrode C, whereas in Figure 1 it is applied between cathode A and the control electrode C. In this modified form of circuit, the values of the resistance 5 and condenser 6 are substantially the same as in Figure 1, and the poling of the winding 7 is such that the voltage applied to the control electrode C has the same lagging phase relation with respect to the voltage applied to anode B. It is apparent that the voltage of the control electrode C with respect to the cathode A is the vector sum of the control voltage derived from across resistance 5 and the line voltage 3—4. The load may be connected either in the position shown at L or in the position L', and, in some cases, it may be divided between the two positions.

In Figures 1 and 2, it will be understood that condenser 9 is not necessary where the variable contact 5' is employed to vary the amplitude of the control voltage, but where the connection between the control electrode and resistance 5 is by a fixed contact this condenser may be used to vary the voltage applied to the control electrode. It is obvious, however, that the two forms of control may be used together, one supplementing the other.

Figure 3:
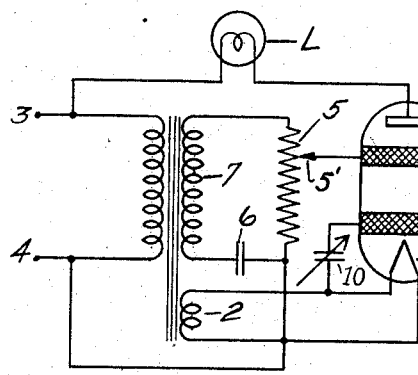
Figure 3 illustrates a form of the control circuit employing a relay having two control electrodes, originally disclosed in my earlier application Ser. No. 577,691.

The control circuit shown in Figure 3 is taken from my copending application Ser. No. 577,691. This circuit arrangement is substantially like that shown in Figure 1 with the addition, however, of an extra control electrode C' and a variable condenser 10 connecting this control electrode to the cathode circuit. With a high negative voltage impressed upon electrode C, varying condenser 10 will cause a variation in the anode current flowing through the load L. In this case, however, increasing the capacity of the variable condenser increases the anode current, and decreasing the capacity results in a decrease in the anode current. The two control electrodes C and C' may be formed each of a single turn of wire placed about the tube, and spaced apart a distance of the order of an inch, or they may be formed as band electrodes if desired. The relative positions of these two control electrodes may be reversed from that shown in the drawings, that is, the lead from contact 5' may be connected to grid C', and the lead from condenser 10 connected to grid C. While the exact nature of the operation of this circuit is not entirely clear, it is obvious that the presence of the second control electrode C' and its associated connection exerts a modifying action upon the action of the control electrode C.

The circuit shown in Figure 3 may be modified by omitting variable condenser 10 and connecting the second grid C' to a source of variable voltage, for example, a direct connection from the grid to a variable tap on resistance 5 may be provided, or the second grid may be connected to any source of variable voltage such as a low frequency microphone circuit. In the latter case, the anode circuit must be supplied with ultra-audible frequency in order for the circuit to be employed as a telephone amplifier or modulator. Also, the variable condenser 10 in Figure 3 may be replaced by a variable resistance of high value, for example, a resistance of the order of 250,000 ohms or higher. It is also obvious that a small condenser may be inserted in the connection between electrode C and resistance 5, and, if desired, this condenser may be made variable to vary the magnitude of the potential applied to this electrode.

Figure 4:
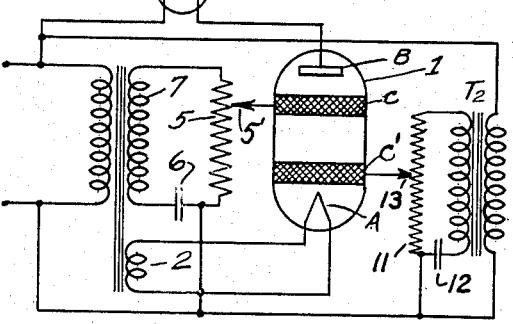
Figure 4 is a modification of the arrangement disclosed in Figure 3.

The circuit shown in Figure 4 is a modification of Figure 3 wherein a second transformer T2 is provided for supplying a control voltage to the control electrode C'. The phase relation of this control voltage is determined by the values of resistance 11 and condenser 12 and by the poling of transformer T2, and the value of the voltage applied to the control electrode C' may be varied by varying the position of sliding contact 13. The phase relation of the control voltage applied to the electrode C may be the same as that for the circuits in Figures 1 to 3, or it may be displaced in phase fully 180° with respect to the anode voltage. The phase relation of the voltage applied to the electrode C' will depend somewhat upon the phase relation of the voltage applied to the electrode C. The poling of the transformers must be such that one of the transformers supplies a control voltage to restrain or delay the starting of the arc, while the other transformer may be operated with either poling. When the poling is such that both control grids are of the same polarity with respect to the anode, they each control the arc in the same sense when used either individually or together, that is, each dims or decreases the load when its potential is increased. When the polarity of one transformer is reversed, the corresponding control grid acts in an opposite sense with respect to the other, and an increase in the applied voltage results in an increase in the arc current. I prefer to impress upon one of the grids, preferably grid C, a high negative potential sufficient to extinguish the arc and then impress a positive potential on grid C' of variable amplitude to control the time of starting of the arc, and thereby control the magnitude of the load current. Variable condensers may be employed in the leads to control electrodes C and C', as explained above in connection with Figures 1 to 3.

In Figures 1 to 4, and in all circuits based upon these figures, the condenser 6 may be connected in this control circuit adjacent the other terminal of the winding 7 instead of in the position shown; or the capacity reactance represented by this condenser may be divided between two condensers connected in the circuit adjacent the two transformer terminals.

In Figures 1 to 4, and in any circuit derived from these circuits wherein the condenser 6 is connected directly between the transformer winding 7 and the cathode circuit, this condenser may be omitted entirely in case there is sufficient capacity existing between the winding 7 and the cathode winding 2 of the transformer to produce the required phase displacement of the control voltage. In this case the lower terminal of winding 7 will remain free and disconnected, and the value of resistance 5 will depend upon the value of the capacity existing between the two transformer windings.

Any of the circuits shown herein provided with a variable condenser for controlling the tube may be employed for the purpose of detecting the passage of persons or objects along a passageway by forming the variable condenser of plates of suitable size arranged on opposite sides of the passageway. The passage of a person or an object, such as an automobile, between the fixed plates will vary the capacity of the condenser and cause the anode current to vary correspondingly. The variation in anode current may be utilized through well known means for indicating or recording the number of passages taking place, or for indicating the presence of an object at a certain point in the passageway. The indicating device may be located at a point remote from the control tube. These circuits may be used for body capacity detection without the special condenser construction described above, and by using ordinary variable condensers as shown, by simply attaching a lead to the screen and placing it so that the object to be detected comes near the lead. Other possible applications of the various circuits disclosed herein are described in my copending application Ser. No. 577,691.

Figure 5:
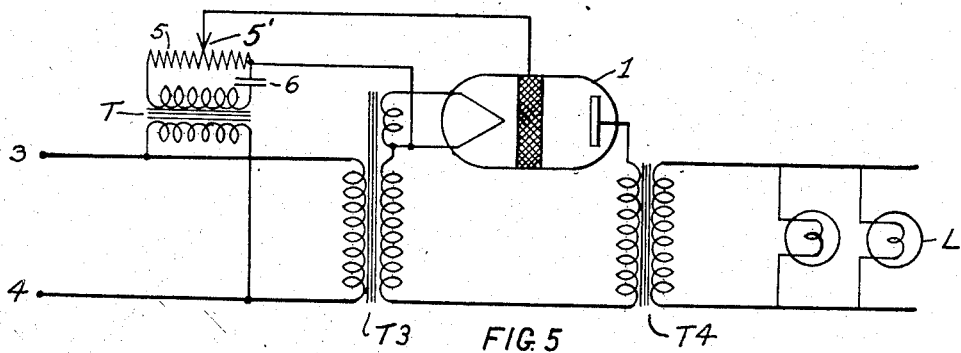
Figure 5 illustrates one form of control circuit for the control of relatively large amounts of power by control apparatus having relatively small current carrying capacity.

In Figure 5 is shown a control circuit for varying the power supplied to a load by means of a control tube having relatively low current carrying capacity. In this circuit two transformers T3 and T4 are connected in cascade in the line between the load and the source of alternating current 3—4. Transformer T3 has a step-up ratio between the primary and secondary while transformer T4 has a step-down ratio, and the control tube 1 is connected in the high-voltage, low-current link circuit connecting the two transformers. The transformation ratios of the two transformers are suitably chosen so that the necessary load current will be produced without exceeding the current carrying capacity of the relay tube and so that the voltage applied to the tube will not exceed the inverse voltage rating of the tube.

Figure 6:
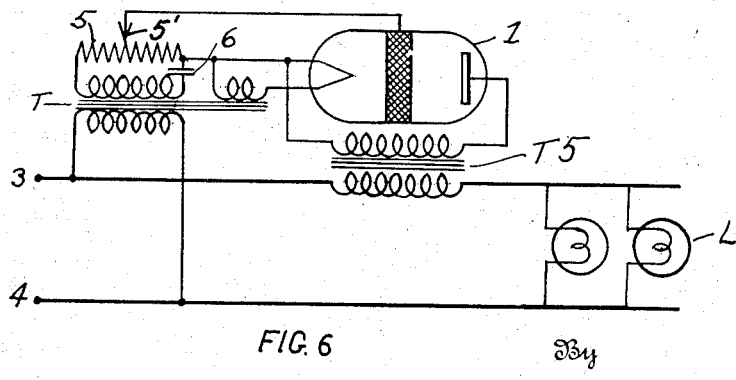
Figure 6 is a modification of Figure 5.

Figure 6 shows another form of high efficiency control circuit for controlling large amounts of power by a tube having small current carrying capacity. This arrangement requires one less transformer than the arrangement shown in Figure 5. In this case one terminal of the current source is connected directly in the load circuit and the other terminal is connected to the load through the primary winding of a step-up transformer T5. The tube 1 is connected across the secondary winding of the transformer to form a link circuit for effectively coupling the source and the load. For zero or low current values flowing through the tube, the primary of transformer T5 offers high impedance to current flowing through the load, and therefore, limits the load current. As the potential upon the grid of the control tube is adjusted to permit the current to flow through the tube for a longer period of time during each positive pulsation the effective impedance of the primary of the transformer is reduced and the load current increased. Full load current flows when current is allowed to flow through the control tube for the entire duration of each positive pulse. The ratio of transformer T5 is suitably chosen so that the voltage is stepped up into the secondary to a value not to exceed the inverse voltage value permissible on the tube, and the current in the secondary winding must not exceed the current carrying capacity of the tube.

The arrangement for supplying control voltages to the tubes in Figures 5 and 6 is the same as the fundamental circuit shown in Figure 1, but it will be understood that any of the control systems shown in Figures 1 to 4 may be used. It will also be understood that control may be accomplished by other known method such as by the application of a restraining control potential of constant amplitude and variable phase.

Figure 7:
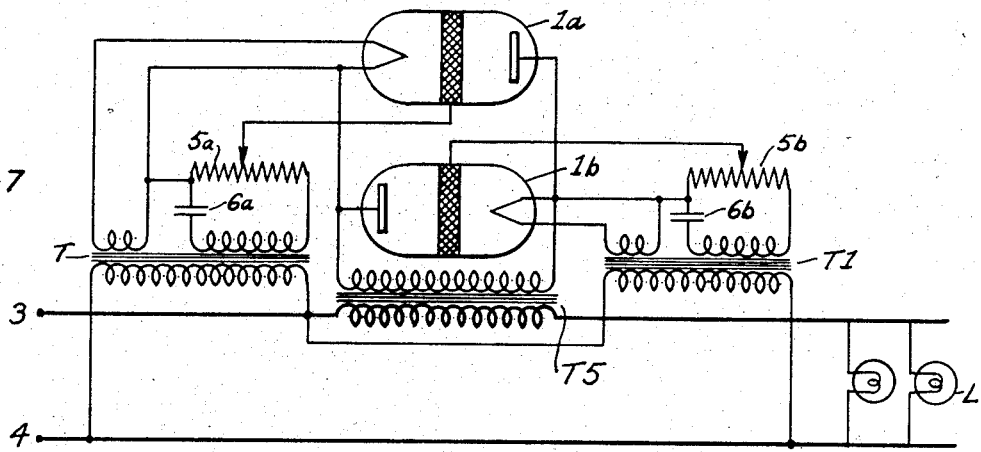
Figure 7 is an expansion of the circuit of Figure 6 for full wave operation.

In the arrangements shown in Figures 5 and 6, current flows through the circuit for only a regulatable portion of one-half period of the alternating cycle, that is, for a portion of the pulse in which the anode of the tube is positive with respect to the cathode. In Figure 7 I have shown the arrangement of Figure 6 expanded to produce full wave operation. This is accomplished by merely providing duplicate tubes 1a and 1b (and duplicated control apparatus) connected in reverse direction. The two variable contacts controlling the two tubes may be interlocked mechanically and provided with a common operating handle. If desired, variable condensers may be used to control the tubes of Figure 7, instead of the variable contacts, and the condensers may be operated on a common shaft. It is obvious that the circuit of Figure 5 may be expanded for full-wave operation in the same manner.

Figure 8:
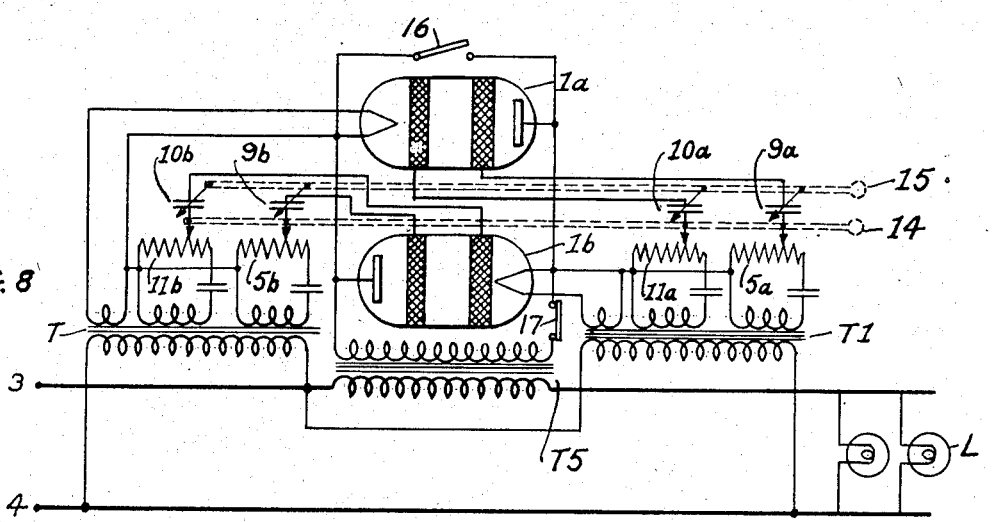
Figure 8 is a further modification of the circuit of Figure 6.

Figure 8 illustrates a further modification of the circuit shown in Figure 6. This arrangement is provided with two control tubes 1a and 1b of the type shown in Figure 4 connected in reverse relation for full wave operation. Separate secondary windings provided with separate phase determining impedances are provided for each of the four control electrodes, and the control voltages are impressed between the anode and the control electrodes as in Fig. 2. It is obvious, however, that a single secondary winding may supply control voltages for at least two control electrodes by providing two variable contacts on the resistance element. The four variable contacts, or such contacts as require movement for control purposes, may be moved simultaneously by a common operating member indicated diagrammatically at 14, and a common operating member 15 may be provided for the variable condensers in the control circuits. As explained above in connection with Figure 4, the voltage applied to one of the grids of each tube may remain fixed after being adjusted to the proper value, and complete control obtained by varying the voltage applied to the other grid. It will also be understood that the variable condensers may be dispensed with if control is effected by operating the variable contacts, but both forms of control may be used if desired. If desired, a switch 16 may be employed to short-circuit the secondary (or the primary) of transformer T5 at full load adjustment, and a switch 17 may be employed to open the secondary circuit at zero load. These switches may be operated by members 14 or 15.

The arrangements shown in Figures 5 to 8 are especially useful as control circuits for dimming theater lights. In such systems, the supply at the terminals 3—4 may be the usual commercial circuits of 110 or 220 volts, and the load comprises a circuit of lamps of corresponding voltage ratings. By these circuits it is possible to vary the magnitude of a load current many times larger than the current capacity of the control tube. These circuits are particularly advantageous in that the losses incidental to the operation of the circuits are extremely low thereby resulting in very high operating efficiency.

Figure 9:
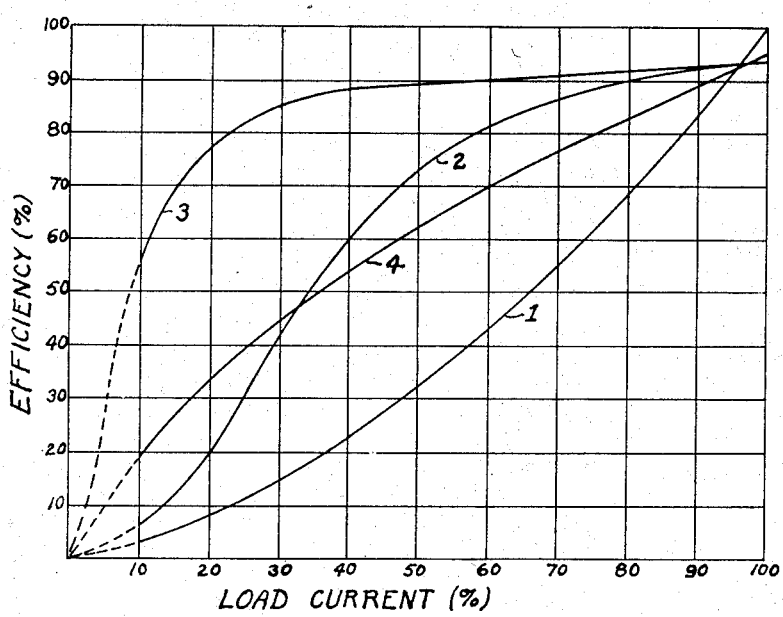
Figure 9 illustrates efficiency curves for various forms of control systems.

For the purpose of comparing the efficiency of these systems with other systems, I have reproduced in Figure 9 representative efficiency curves of various systems employed to control a 2 kva. lamp load. Curve 1 illustrates the efficiency of a simple resistance dimmer system in which a variable resistance is inserted in series with the lamp load. The drooping character of this curve is due to the high positive temperature coefficient of the load. Curve 2 is an efficiency curve for dimmer circuits of the type employing a saturatable core reactor connected in series with the lamp load. Curve 3 illustrates the efficiency of dimmer circuits of the type shown in Figures 5 to 8 of this application, and curve 4 illustrates the efficiency of a circuit like that shown in Figure 6 wherein a variable resistance is substituted for the control tube 1.

From an inspection of the curves shown in Figure 9 it will be seen that while the simple resistance dimmer system is one hundred per cent efficient at full load, this circuit is very inefficient at less than full load values, and is, therefore, not suited for dimmer purposes which involves the operation of a circuit for considerable periods at fractional load values. While the efficiency of the saturated reactor circuit as shown by curve 2 maintains a fairly high percentage in the neighborhood of full load values, the efficiency of this system drops off sharply below 60% load current. Curve 3 illustrates the efficiency of applicant's system, and the advantage of this system over the other systems is clearly shown by the materially increased efficiency at load values ranging from 60% full load current downward. The advantage of this system is apparent, since the region of increased efficiency falls within the operating range of the usual dimmer system.

Curve 4 has been inserted to show the advantage of applicant's system over a system in which a variable resistance replaces the vapor electric tube shown in Figure 6. The improved efficiency of applicant's system is due mainly to the fact that the vapor electric tube possesses low internal impedance. Within the working range of the tube, the voltage drop across the tube remains substantially constant at from 10 to 25 volts depending upon the particular construction of the tube. The advantage of inserting a step-up transformer between the load circuit and the tube, instead of inserting the tube directly in the load circuit, is that a tube of relatively small current carrying capacity may be employed, thereby resulting in less loss within the tube itself and in a material reduction in the losses incidental to the operation of the tube, such as the filament circuit losses, etc. This advantage will become apparent by comparison of the losses incidental to the operation of a tube capable of carrying directly a full load current of 15 amperes, and the losses in a tube required to handle the same load current through a step-up transformer of 10 to 1 ratio. The cathode heating losses in these tubes are roughly 125 watts and 25 watts, and the losses within the tubes themselves bear a ratio of 10 to 1. The improved efficiencies in applicant's system for small load current values is due in part also to the choking effect of the inherent reactance or leakage reactance of the step-up transformer upon the complex current which flows through the circuit at less than full load value. This complex current contains a large percentage of current components having frequencies higher than the fundamental or supply frequency, and the leakage reactance of the transformers exerts a greater choking effect upon these higher frequency components.

The control circuits which I have disclosed in this application and in my earlier application may be used as constant current (or voltage) regulators. It will be seen that as the anode becomes positive with respect to the cathode, the grid becomes negative. An increase in the value of the line voltage 3—4 tends to cause a greater anode current to flow, but this tendency is offset by the fact that the negative potential on the grid (tending to reduce the anode current) also increases. By proper adjustments of the circuit constants a substantially constant current will flow through the load even though the line voltage varies a substantial amount.

My invention may be embodied in other circuit arrangements and modifications of those disclosed herein, and may be applied to various other uses. Accordingly, the scope of my protection is to be limited only by the annexed claims.

What I claim is:

1. An electric control system comprising a vapor electric device having a cathode, an anode and a control electrode, an alternating current circuit including the space current path of said device, means for impressing between said control electrode and said anode an alternating voltage displaced in phase substantially less than 180° with respect to the anode-cathode voltage, and means for varying the amplitude of said alternating control voltage.

2. An electric control system comprising a vapor electric device having a cathode, an anode and a control electrode, an alternating current circuit including the space current path of said device, means for impressing between said control electrode and said anode an alternating voltage lagging in phase substantially less than 180° with respect to the anode-cathode voltage, and means for varying the amplitude of said alternating control voltage.

3. An electric control system comprising a vapor electric device having a cathode, an anode and a control electrode, an alternating current circuit including the space current path of said device, means for impressing between said control electrode and said anode an alternating voltage having a lagging phase displacement with respect to the anode-cathode voltage greater than 90° and substantially less than 180°.

4. An electric control system comprising a vapor electric device having a cathode, an anode and a control electrode, an alternating current circuit including the space current path of said device, means for impressing between said control electrode and said anode an alternating voltage having a lagging phase displacement with respect to said anode-cathode voltage of the order of 135°, and means for varying the amplitude of said alternating control voltage.

5. In an electric control system, the combination of a source of alternating current, a vapor electric device having a cathode, an anode and a control electrode, a work circuit including said source and the space current path of said device, a second circuit connected to said source including a condenser and a resistance element connected in series, and a control circuit for said device connected between the anode and the control electrode including a variable portion of said resistance.

6. In an electric control system, the combination of a source of alternating current, a vapor electric device having a cathode, an anode and a control electrode, a work circuit including said source and the space current path of said device, a second circuit connected to said source including a condenser and a fixed resistance element connected in series, and a control circuit for said device connected between the anode and the control electrode including means for impressing upon said control electrode a variable alternating potential derived from across said resistance.

7. In an electric control system, the combination of a source of alternating current, a vapor electric device having a cathode, an anode and a control electrode, a work circuit including said source and the space current path of said device, a second circuit connected to said source including a condenser and a resistance element connected in series, a control circuit for said device connected between the anode and the control electrode including at least a portion of said resistance, and a variable condenser inserted in the connection between said resistance and said control electrode.

8. An electric control system comprising a vapor electric device having a cathode, an anode and means for influencing the discharge between said cathode and anode comprising two control electrodes, an alternating current circuit including the space current path of said device, means for impressing upon one of said control electrodes an alternating voltage to delay the starting of the arc, and a variable impedance control element connecting said second control electrode to a point on said alternating current circuit.

9. An electric control system comprising a vapor electric device having a cathode, an anode and two control electrodes, an alternating current circuit including the space current path of said device, means for impressing upon one of said control electrodes an alternating voltage having a lagging phase displacement with respect to the voltage of said anode greater than 90° and substantially less than 180°, and a variable condenser connected between said second control electrode and said cathode.

10. An electric control system comprising a vapor electric device having a cathode, an anode and two control electrodes, an alternating current circuit including the space current path of said device, means for impressing upon one of said control electrodes an alternating voltage of constant amplitude having a lagging phase displacement with respect to said anode voltage of the order of 135°, and a variable condenser connected between said second control electrode and said cathode.

11. An electric control system comprising a vapor electric device having a cathode, an anode and two control electrodes, an alternating current circuit including the space current path of said device, means for impressing upon one of said control electrodes an alternating current voltage having a phase relation with respect to the anode-cathode voltage to normally prevent the starting of the arc within said device, and means connected to the second control electrode to control the time of starting of the arc.

12. An electric control system comprising a vapor electric device having a cathode, an anode and two control electrodes, an alternating current circuit including the space current path of said device, means for impressing upon one of said control electrodes an alternating voltage having a lagging phase displacement with respect to the voltage of said anode greater than 90° and substantially less than 180° to normally prevent the starting of the arc, and means for applying a variable potential to the second control electrode to control the time of starting of the arc.

13. An electric control system comprising a vapor electric device having a cathode, an anode and two control electrodes, an alternating current circuit including the space current path of said device, means for impressing upon one of said control electrodes an alternating voltage of constant amplitude having a lagging phase displacement with respect to said anode voltage of the order of 135° to normally prevent the starting of the arc in said device, and means for applying a variable alternating potential to the second control electrode to control the time of starting of the arc.

14. An electric control system comprising a vapor electric device having a cathode, an anode and two control electrodes, an alternating current circuit including the space current path of said device, means for impressing upon one of said control electrodes an alternating voltage of constant amplitude to normally prevent the starting of the arc in said device, and means for impressing upon the second control electrode an alternating voltage of fixed phase and variable amplitude to control the time of starting of the arc.

15. An electric control system comprising a vapor electric device having a cathode, an anode and two control electrodes, an alternating current circuit including the space current path of said device, said control electrodes being insulated from the space discharge path of said device, means for impressing upon one of said control electrodes an alternating voltage to delay the starting of the arc, and a variable impedance control element connecting said second control electrode to a point on said alternating current circuit.

16. An electric control system comprising a vapor electric device having a cathode, an anode and two control electrodes, an alternating current circuit including the space current path of said device, said control electrodes being insulated from the space discharge path of said device, means for impressing upon one of said control electrodes a voltage to normally prevent the starting of the arc within said device, and means connected to the second control electrode to control the time of starting of the arc.

17. An electric control system comprising a vapor electric device having a cathode, an anode and a control electrode, an alternating current circuit including the space current path of said device, means for impressing upon said control electrode an alternating voltage of constant amplitude having a lagging phase displacement with respect to said anode voltage of the order of 135 degrees, and a variable impedance element in an alternating current circuit associated with said device for varying the magnitude of the control of said alternating voltage upon said device keeping the phase and amplitude of said control voltage constant.

PALMER HUNT CRAIG.